(12) United States Patent
Tago et al.

(10) Patent No.: US 8,797,482 B2
(45) Date of Patent: Aug. 5, 2014

(54) LIQUID CRYSTAL DISPLAY DEVICE

(75) Inventors: Keiji Tago, Kumagaya (JP); Jin Hirosawa, Saitama (JP); Hirokazu Morimoto, Fukaya (JP)

(73) Assignee: Japan Display Inc., Tokyo (JP)

( * ) Notice: Subject to any disclaimer, the term of this patent is extended or adjusted under 35 U.S.C. 154(b) by 57 days.

(21) Appl. No.: 13/414,079

(22) Filed: Mar. 7, 2012

(65) Prior Publication Data

US 2013/0033663 A1   Feb. 7, 2013

(30) Foreign Application Priority Data

Aug. 5, 2011   (JP) .................................. 2011-171717

(51) Int. Cl.
*G02F 1/1335* (2006.01)

(52) U.S. Cl.
USPC ................. 349/103; 349/96; 349/39

(58) Field of Classification Search
CPC ............................ G02F 1/1343; G02F 1/1335
USPC ............................................ 349/103, 139, 96
See application file for complete search history.

(56) References Cited

U.S. PATENT DOCUMENTS

| | | | |
|---|---|---|---|
| 6,266,116 B1 | 7/2001 | Ohta et al. | |
| 7,317,500 B2 | 1/2008 | Morimoto et al. | |
| 7,471,358 B2 | 12/2008 | Tago et al. | |
| 7,742,135 B2 | 6/2010 | Tago et al. | |
| 2001/0001567 A1* | 5/2001 | Lyu et al. ...................... | 349/143 |
| 2001/0010575 A1 | 8/2001 | Yoshida et al. | |
| 2002/0030777 A1* | 3/2002 | Noguchi et al. .............. | 349/123 |
| 2002/0051109 A1* | 5/2002 | Nakanishi et al. ............ | 349/147 |
| 2004/0165136 A1 | 8/2004 | Sugiyama et al. | |
| 2005/0206824 A1 | 9/2005 | Son et al. | |
| 2005/0219453 A1 | 10/2005 | Kubo et al. | |
| 2007/0115234 A1 | 5/2007 | Kim et al. | |
| 2008/0062358 A1 | 3/2008 | Lee et al. | |
| 2008/0180590 A1 | 7/2008 | Lee et al. | |
| 2008/0180623 A1 | 7/2008 | Lee et al. | |
| 2008/0186439 A1 | 8/2008 | Kwon et al. | |
| 2008/0218667 A1 | 9/2008 | Tago | |
| 2009/0207363 A1 | 8/2009 | Hirosawa | |
| 2009/0225257 A1* | 9/2009 | Sugiyama et al. .............. | 349/96 |
| 2011/0234947 A1 | 9/2011 | Hirosawa | |

FOREIGN PATENT DOCUMENTS

| | | |
|---|---|---|
| JP | 6-222397 | 8/1994 |
| JP | 7-159807 | 6/1995 |
| JP | 9-105908 | 4/1997 |
| JP | 9-160041 | 6/1997 |

(Continued)

OTHER PUBLICATIONS

U.S. Appl. No. 13/339,915, filed Dec. 29, 2011, Takano, et al.

(Continued)

*Primary Examiner* — Lucy Chien

(74) *Attorney, Agent, or Firm* — Oblon, Spivak, McClelland, Maier & Neustadt, L.L.P.

(57) ABSTRACT

According to one embodiment, a liquid crystal display device includes a first substrate including a first insulative substrate, and a first electrode, a second substrate including a second insulative substrate, and a second electrode, a liquid crystal layer held between the first substrate and the second substrate, a first polarizer including a first polarization axis, and a second polarizer including a second polarization, wherein the first polarization axis is substantially parallel or substantially perpendicular to the direction of extension of the first electrode.

3 Claims, 4 Drawing Sheets

(56) References Cited

FOREIGN PATENT DOCUMENTS

| | | |
|---|---|---|
| JP | 9-160042 | 6/1997 |
| JP | 9-160061 | 6/1997 |
| JP | 10-26765 | 1/1998 |
| JP | 10-90708 | 4/1998 |
| JP | 10-333170 | 12/1998 |
| JP | 2002-49059 | 2/2002 |
| JP | 2002-139735 | 5/2002 |
| JP | 2002-139737 | 5/2002 |
| JP | 2005-3802 | 1/2005 |
| JP | 3644653 | 2/2005 |
| JP | 2005-242307 | 9/2005 |
| JP | 2007-41553 | 2/2007 |
| JP | 2007-133193 | 5/2007 |
| JP | 2009-55008 | 3/2009 |
| JP | 2009-192822 | 8/2009 |
| JP | 2000-229895 | 10/2009 |

OTHER PUBLICATIONS

U.S. Appl. No. 13/348,906, filed Jan. 12, 2012, Morita, et al.
U.S. Appl. No. 13/425,779, filed Mar. 21, 2012, Takano, et al.
U.S. Appl. No. 13/738,417, filed Jan. 10, 2013, Hirosawa.
Japanese Office Action issued Sep. 3, 2013, in Japan Patent Application No. 2011-171717 (with English translation).
Office Action mailed Mar. 18, 2014 in Japanese Patent Application No. 2011-171717 filed Aug. 5, 2011 (with English translation).

\* cited by examiner

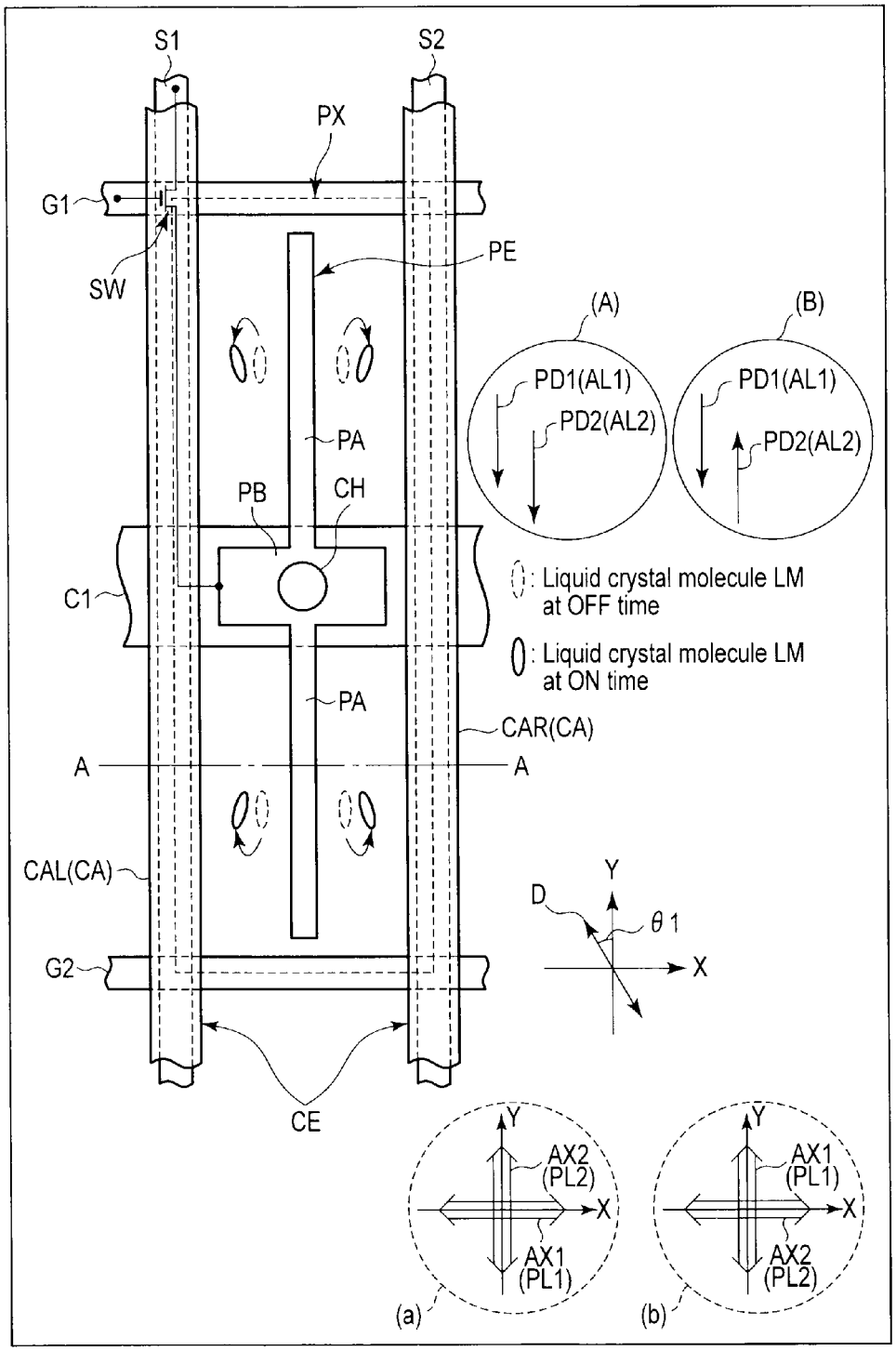
F I G. 2

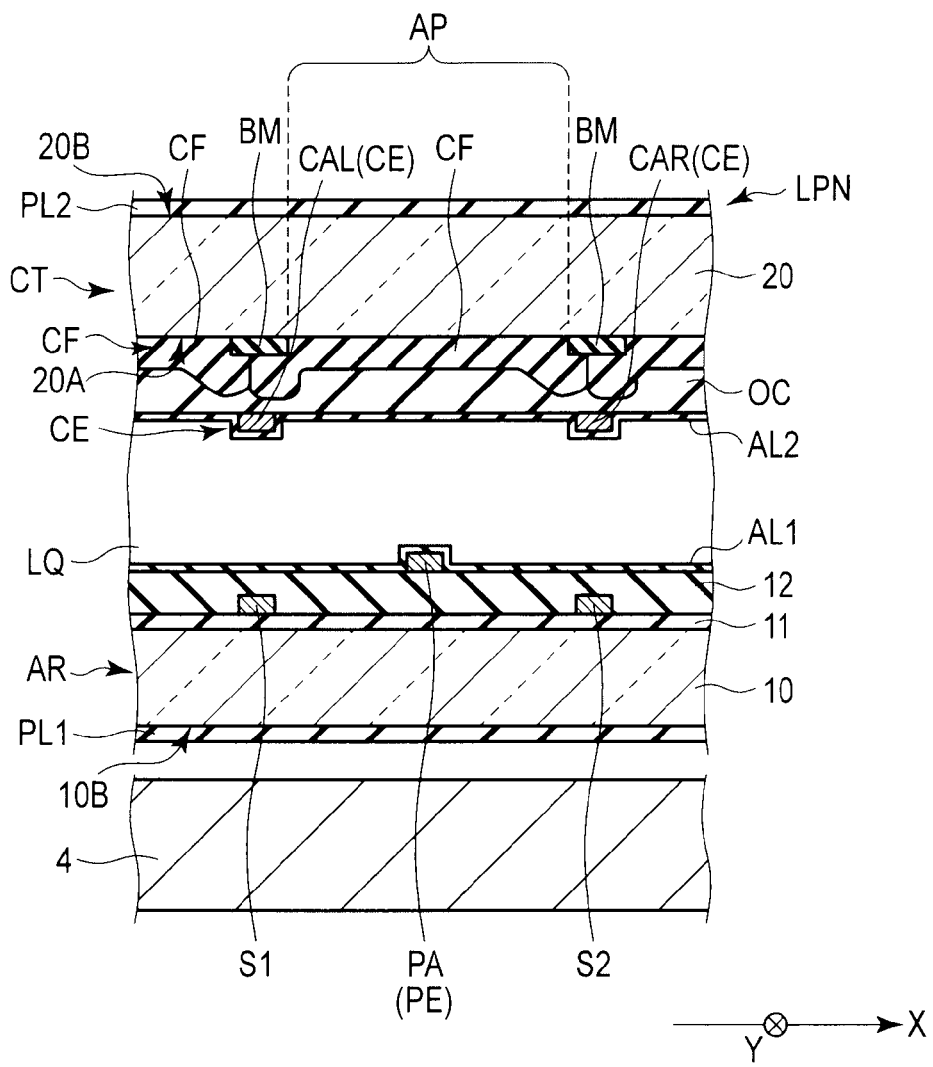
F I G. 3

LIQUID CRYSTAL DISPLAY DEVICE

CROSS-REFERENCE TO RELATED APPLICATIONS

This application is based upon and claims the benefit of priority from prior Japanese Patent Application No. 2011-171717, filed Aug. 5, 2011, the entire contents of which are incorporated herein by reference.

FIELD

Embodiments described herein relate generally to a liquid crystal display device.

BACKGROUND

In recent years, flat-panel display devices have been vigorously developed. By virtue of such advantageous features as light weight, small thickness and low power consumption, special attention has been paid to liquid crystal display devices among others. In particular, in active matrix liquid crystal devices in which switching elements are incorporated in respective pixels, attention is paid to the configuration which makes use of a lateral electric field (including a fringe electric field), such as an IPS (In-Plane Switching) mode or an FFS (Fringe Field Switching) mode. Such a liquid crystal display device of the lateral electric field mode includes pixel electrodes and a counter-electrode, which are formed on an array substrate, and liquid crystal molecules are switched by a lateral electric field which is substantially parallel to a major surface of the array substrate.

On the other hand, there has been proposed a technique wherein a lateral electric field or an oblique electric field is produced between a pixel electrode formed on an array substrate and a counter-electrode formed on a counter-substrate, thereby switching liquid crystal molecules.

BRIEF DESCRIPTION OF THE DRAWINGS

FIG. 2 is a plan view which schematically shows a structure example of a pixel at a time when a liquid crystal display panel shown in FIG. 1 is viewed from a counter-substrate side.

FIG. 3 is a schematic cross-sectional view, taken along line A-A in FIG. 2, showing a cross-sectional structure of the liquid crystal display panel shown in FIG. 2.

DETAILED DESCRIPTION

Figure 1:
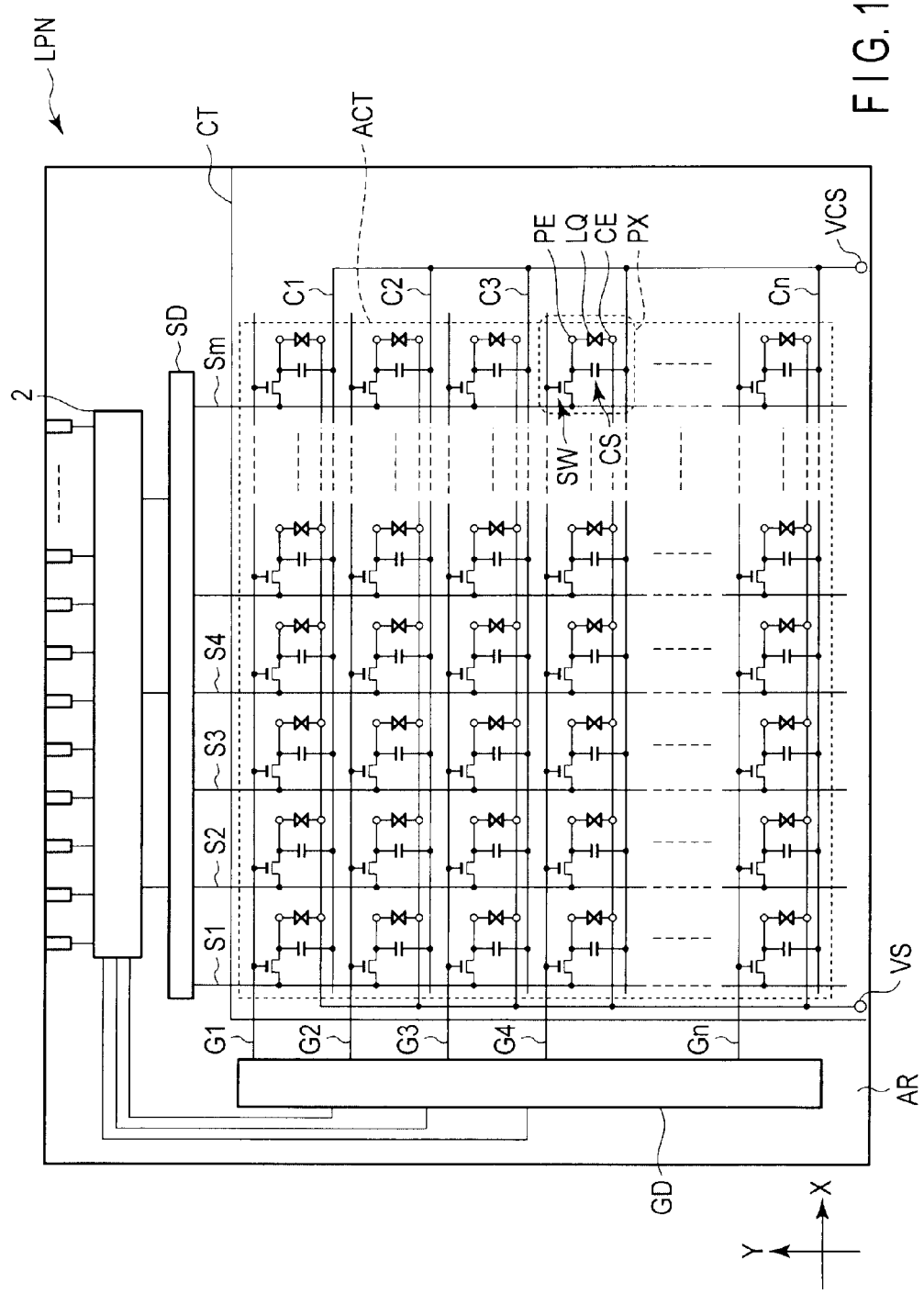
FIG. 1 is a view which schematically illustrates a structure and an equivalent circuit of a liquid crystal display device according to an embodiment.

In general, according to one embodiment, a liquid crystal display device includes a first substrate including a first insulative substrate, a first electrode linearly extending on an inside of the first insulative substrate, and a first alignment film covering the first electrode, a second substrate including a second insulative substrate, a second electrode which extends in a direction which is substantially parallel to a direction of extension of the first electrode on both sides of the first electrode, on that side of the second insulative substrate, which is opposed to the first substrate, and a second alignment film covering the second electrode, a liquid crystal layer including liquid crystal molecules held between the first substrate and the second substrate, a first polarizer which is disposed on an outer surface of the first insulative substrate and includes a first polarization axis, and a second polarizer which is disposed on an outer surface of the second insulative substrate and includes a second polarization axis having a positional relationship of crossed Nicols with the first polarization axis, wherein the first polarization axis is substantially parallel or substantially perpendicular to the direction of extension of the first electrode.

According to another embodiment, a liquid crystal display device includes a first substrate including a first insulative substrate, a first wiring line extending in a first direction on an inside of the first insulative substrate, a first insulation film covering the first wiring line, a second wiring line extending on the first insulation film in a second direction which is substantially perpendicular to the first direction, a second insulation film covering the second wiring line, a first electrode extending in the second direction on the second insulation film, and a first alignment film covering the first electrode, a second substrate including a second insulative substrate, a second electrode which extends in the second direction on both sides of the first electrode, on that side of the second insulative substrate, which is opposed to the first substrate, and a second alignment film covering the second electrode, a liquid crystal layer including liquid crystal molecules held between the first substrate and the second substrate, a first polarizer which is disposed on an outer surface of the first insulative substrate and includes a first polarization axis which is substantially parallel to the first direction or the second direction, and a second polarizer which is disposed on an outer surface of the second insulative substrate and includes a second polarization axis having a positional relationship of crossed Nicols with the first polarization axis.

According to another embodiment, a liquid crystal display device includes a first substrate including a first insulative substrate, a first signal wiring line and a second signal wiring line each extending in a first direction on an inside of the first insulative substrate, a third signal wiring line extending in the first direction on the inside of the first insulative substrate and located at a substantially middle point between the first signal wiring line and the second signal wiring line, a first insulation film covering the first signal wiring line, the second signal wiring line and the third signal wiring line, a fourth signal wiring line and a fifth signal wiring line each extending on the first insulation film in a second direction which is substantially perpendicular to the first direction, a second insulation film covering the fourth signal wiring line and the fifth signal wiring line, a switching element electrically connected to the first signal wiring line and the fourth signal wiring line, a first electrode extending in the second direction on the second insulation film, a sub-electrode extending from the first electrode toward the fourth signal wiring line and the fifth signal wiring line and electrically connected to the switching element, and a first alignment film covering the first electrode and the sub-electrode, a second substrate including a second insulative substrate, a second electrode extending in the second direction and opposed to the fourth signal wiring line and the fifth signal wiring line on that side of the second insulative substrate, which is opposed to the first substrate, and a second alignment film covering the second electrode, a liquid crystal layer including liquid crystal molecules held between the first substrate and the second substrate, a first polarizer which is disposed on an outer surface of the first insulative substrate and includes a first polarization axis which is substantially parallel to the first direction or the second direction, and a second polarizer which is disposed on an outer surface of the second insulative substrate and includes a second polarization axis having a positional relationship of crossed Nicols with the first polarization axis.

Embodiments will now be described in detail with reference to the accompanying drawings. In the drawings, structural elements having the same or similar functions are denoted by like reference numerals, and an overlapping description is omitted.

FIG. 1 is a view which schematically shows a structure and an equivalent circuit of a liquid crystal display device according to an embodiment.

Specifically, the liquid crystal display device includes an active-matrix-type liquid crystal display panel LPN. The liquid crystal display panel LPN includes an array substrate AR which is a first substrate, a counter-substrate CT which is a second substrate that is disposed to be opposed to the array substrate AR, and a liquid crystal layer LQ which is disposed between the array substrate AR and the counter-substrate CT. The liquid crystal display panel LPN includes an active area ACT which displays an image. The active area ACT is composed of a plurality of pixels PX which are arrayed in a matrix of m×n (m and n are positive integers).

The liquid crystal display panel LPN includes, in the active area ACT, an n-number of gate lines G (G1 to Gn), an n-number of storage capacitance lines C (C1 to Cn), and an m-number of source lines S (S1 to Sm). The gate lines G and storage capacitance lines C extend in a first direction X. The gate lines G and storage capacitance lines C neighbor at intervals along a second direction Y crossing the first direction X, and are alternately arranged in parallel. In this example, the first direction X and the second direction Y are perpendicular to each other. The source lines S cross the gate lines G and storage capacitance lines C. The source lines S extend substantially linearly along the second direction Y. It is not always necessary that each of the gate lines G, storage capacitance lines C and source lines S extend linearly, and a part thereof may be bent.

In the example illustrated, the gate lines G and storage capacitance lines C correspond to first wiring lines which linearly extend in the first direction X, and the source lines S correspond to second wiring lines which linearly extend in the second direction Y. There may be a case in which the gate lines G and storage capacitance lines C correspond to second wiring lines which linearly extend in the second direction Y, and the source lines S correspond to first wiring lines which linearly extend in the first direction X.

Each of the gate lines G is led out of the active area ACT and is connected to a gate driver GD. Each of the source lines S is led out of the active area ACT and is connected to a source driver SD. At least parts of the gate driver GD and source driver SD are formed on, for example, the array substrate AR, and are connected to a driving IC chip 2 which incorporates a controller.

Each of the pixels PX includes a switching element SW, a pixel electrode PE and a common electrode CE. A storage capacitance CS is formed, for example, between the storage capacitance line C and the pixel electrode PE. The storage capacitance line C is electrically connected to a voltage application module VCS to which a storage capacitance voltage is applied.

In the present embodiment, the liquid crystal display panel LPN is configured such that the pixel electrodes PE are formed on the array substrate AR, and at least a part of the common electrode CE is formed on the counter-substrate CT, and liquid crystal molecules of the liquid crystal layer LQ are switched by mainly using an electric field which is produced between the pixel electrodes PE and the common electrode CE. The electric field, which is produced between the pixel electrodes PE and the common electrode CE, is an oblique electric field which is slightly inclined to an X-Y plane which is defined by the first direction X and second direction Y, or to a substrate major surface of the array substrate AR or a substrate major surface of the counter-substrate CT (or a lateral electric field which is substantially parallel to the substrate major surface).

The switching element SW is composed of, for example, an n-channel thin-film transistor (TFT). The switching element SW is electrically connected to the gate line G and source line S. The switching element SW may be of a top gate type or a bottom gate type. In addition, a semiconductor layer of the switching element SW is formed of, for example, polysilicon, but it may be formed of amorphous silicon.

The pixel electrodes PE are disposed in the respective pixels PX, and are electrically connected to the switching elements SW. The common electrode CE has, for example, a common potential, and is disposed common to the pixel electrodes PE of plural pixels PX via the liquid crystal layer LQ.

The pixel electrode PE and the common electrode CE are formed of a light-transmissive, electrically conductive material such as indium tin oxide (ITO) or indium zinc oxide (IZO). At least one of the pixel electrode PE and the common electrode CE may be formed of, for example, an opaque wiring material, or an electrically conductive material with light-blocking properties or reflectivity. For example, at least one of the pixel electrode PE and common electrode CE may be formed of a metallic material selected from aluminum (Al), titanium (Ti), silver (Ag), molybdenum (Mo), tungsten (W), copper (Cu) and chromium (Cr), or an alloy including one of these elements.

The array substrate AR includes a power supply module VS for applying a voltage to the common electrode CE. The power supply module VS is formed, for example, on the outside of the active area ACT. The common electrode CE is led out to the outside of the active area ACT, and is electrically connected to the power supply module VS via an electrically conductive member (not shown).

FIG. 2 is a plan view which schematically shows a structure example of one pixel PX at a time when the liquid crystal display panel LPN shown in FIG. 1 is viewed from the counter-substrate side. FIG. 2 is a plan view in an X-Y plane.

The array substrate AR includes a gate line G1, a gate line G2, a storage capacitance line C1, a source line S1, a source line S2, a switching element SW, a pixel electrode PE, and a first alignment film AL1. The counter-substrate CT includes a common electrode CE and a second alignment film AL2.

The gate line G1, gate line G2 and storage capacitance line C1 extend in the first direction X. The source line S1 and source line S2 extend in the second direction Y. The storage capacitance line C1 is located at a substantially middle point between the gate line G1 and the gate line G2. Specifically, the distance between the gate line G1 and the storage capacitance line C1 in the second direction Y is substantially equal to the distance between the gate line G2 and the storage capacitance line C1 in the second direction Y.

In the example illustrated, the pixel PX corresponds to a grid region which is formed by the gate line G1, gate line G2, source line S1 and source line S2, as indicated by a broken line in FIG. 2. The pixel PX has a rectangular shape having a greater length in the second direction Y than in the first direction X. The length of the pixel PX in the first direction X corresponds to a pitch between the source line S1 and source line S2 in the first direction X. The length of the pixel PX in the second direction Y corresponds to a pitch between the gate line G1 and gate line G2 in the second direction Y. The pixel electrode PE is disposed between the source line S1 and source line S2 which neighbor each other. In other words, the source line S1 and source line S2 are located on both sides of the pixel electrode PE. In addition, the pixel electrode PE is located between the gate line G1 and gate line G2. In other words, the gate line G1 and gate line G2 are located on both sides of the pixel electrode PE.

In the example illustrated, in the pixel PX, the source line S1 is disposed at a left side end portion, the source line S2 is disposed at a right side end portion, the gate line G1 is disposed at an upper side end portion, and the gate line G2 is disposed at a lower side end portion. Strictly speaking, the source line S1 is disposed to extend over a boundary between the pixel PX and a pixel neighboring on the left side, the source line S2 is disposed to extend over a boundary between the pixel PX and a pixel neighboring on the right side, the gate line G1 is disposed to extend over a boundary between the pixel PX and a pixel neighboring on the upper side, and the gate line G2 is disposed to extend over a boundary between the pixel PX and a pixel neighboring on the lower side. The storage capacitance line C1 is disposed at a substantially central part of the pixel PX.

The switching element SW in the illustrated example is electrically connected to the gate line G1 and source line S1. The switching element SW is provided at an intersection between the gate line G1 and source line S1. A drain line of the switching element SW is formed to extend along the source line S1 and storage capacitance line C1, and is electrically connected to the pixel electrode PE via a contact hole CH formed in an area overlapping the storage capacitance line C1. The switching element SW is provided in an area overlapping the source line S1 and storage capacitance line C1, and does not substantially protrude from the area overlapping the source line S1 and storage capacitance line C1, thus suppressing a decrease in area of an aperture portion which contributes to display.

The pixel electrode PE includes a main pixel electrode PA and a sub-pixel electrode PB. The main pixel electrode PA and sub-pixel electrode PB are formed to be integral or continuous, and are electrically connected to each other. In the meantime, in the example illustrated, only the pixel electrode PE which is disposed in one pixel PX is shown, but pixel electrodes of the same shape are disposed in other pixels, the depiction of which is omitted.

The main pixel electrode PA is located between the source line S1 and source line S2. In the illustrated example, the sub-pixel electrode PB crosses an intermediate portion in the second direction Y of the main pixel electrode PA. Accordingly, the main pixel electrode PA linearly extends in the second direction Y from the intersection with the sub-pixel electrode PB to the vicinity of the upper side end portion of the pixel PX and to the vicinity of the lower side end portion of the pixel PX. Specifically, the pixel electrode PE is formed in a cross shape. In addition, the main pixel electrode PA is disposed at a substantially middle position between the source line S1 and source line S2, that is, at a center of the pixel PX. The distance in the first direction X between the source line S1 and the main pixel electrode PA is substantially equal to the distance in the first direction X between the source line S2 and the main pixel electrode PA. The main pixel electrode PA is formed in a strip shape having a substantially equal width in the first direction X.

The sub-pixel electrode PB crosses the main pixel electrode PA and extends along the first direction X. The sub-pixel electrode PB protrudes from the intersection with the main pixel electrode PA toward the source line S1 and source line S2. In the example illustrated, the sub-pixel electrode PB is opposed to the storage capacitance line C1. Specifically, the entirety of the sub-pixel electrode PB is located in an area overlapping the storage capacitance line C1. The sub-pixel electrode PB is electrically connected to the switching element SW. The sub-pixel electrode PB is formed in a strip shape having a substantially equal width in the second direction Y, and is formed with a greater width than the main pixel electrode PA.

The common electrode CE includes main common electrodes CA. The main common electrodes CA extend, in the X-Y plane, linearly in the second direction Y that is substantially parallel to the direction of extension of the main pixel electrode PA, on both sides of the main pixel electrode PA. Alternatively, the main common electrodes CA are opposed to the source lines S which extend in the second direction Y, and extend substantially in parallel to the direction of extension of the main pixel electrode PA. The main common electrode CA is formed in a strip shape having a substantially equal width in the first direction X.

In the example illustrated, two main common electrodes CA are arranged in parallel with a distance in the first direction. Specifically, the main common electrodes CA include a main common electrode CAL disposed at the left side end portion of the pixel PX, and a main common electrode CAR disposed at the right side end portion of the pixel PX. Strictly speaking, the main common electrode CAL is disposed to extend over a boundary between the pixel PX and a pixel neighboring on the left side, and the main common electrode CAR is disposed to extend over a boundary between the pixel PX and a pixel neighboring on the right side. The main common electrode CAL is opposed to the source line S1, and the main common electrode CAR is opposed to the source line S2. The main common electrode CAL and the main common electrode CAR are electrically connected to each other within the active area or outside the active area.

Paying attention to the positional relationship between the pixel electrode PE and the main common electrodes CA, the pixel electrode PE and the main common electrodes CA are alternately arranged along the first direction X. The main pixel electrode PA and the main common electrodes CA are disposed in parallel to each other. In this case, in the X-Y plane, each of the main common electrodes CA does not overlap the pixel electrode PE. Transmissive regions, through which light can pass, are formed between the pixel electrode PE and the main common electrodes CA.

One pixel electrode PE is located between the main common electrode CAL and main common electrode CAR which neighbor each other. In other words, the main common electrode CAL and main common electrode CAR are disposed on both sides of a position immediately above the pixel electrode PE. Alternatively, the pixel electrode PE is disposed between the main common electrode CAL and main common electrode CAR. Thus, the main common electrode CAL, main pixel electrode PA and main common electrode CAR are arranged in the named order along the first direction X.

The distance between the pixel electrode PE and the common electrode CE in the first direction X is substantially constant. The main pixel electrode PA shown in FIG. 2 is located at a substantially middle point between the main common electrode CAL and main common electrode CAR. Specifically, the distance between the main common electrode CAL and the main pixel electrode PA in the first direction X is substantially equal to the distance between the main common electrode CAR and the main pixel electrode PA in the first direction X.

FIG. 3 is a schematic cross-sectional view, taken along line A-A in FIG. 2, showing a cross-sectional structure of the liquid crystal display panel LPN shown in FIG. 2. FIG. 3 shows only parts which are necessary for the description.

A backlight 4 is disposed on the back side of the array substrate AR which constitutes the liquid crystal display panel LPN. Various modes are applicable to the backlight 4. As the backlight 4, use may be made of either a backlight which utilizes a light-emitting diode (LED) as a light source, or a backlight which utilizes a cold cathode fluorescent lamp (CCFL) as a light source. A description of the detailed structure of the backlight 4 is omitted.

The array substrate AR is formed by using a first insulative substrate 10 having light transmissivity. The array substrate AR includes, on the inside of the first insulative substrate 10, the source line S1, source line S2, pixel electrode PE including the main pixel electrode PA, a first insulation film 11, a second insulation film 12, and a first alignment film AL1.

The source line S1 and source line S2 are formed on the first insulation film 11 and are covered with second insulation film 12. The gate lines and storage capacitance lines, which are not shown, are disposed, for example, between the first insulative substrate 10 and the first insulation film 11. The main pixel electrode PA of the pixel electrode PE is formed on the second insulation film 12. The main pixel electrode PA is located on the inside of positions immediately above the source line S1 and source line S2.

The first alignment film AL1 is disposed on that surface of the array substrate AR, which is opposed to the counter-substrate CT, and the first alignment film AL1 extends over substantially the entirety of the active area ACT. The first alignment film AL1 covers the pixel electrode PE, etc., and is also disposed over the second insulation film 12. The first alignment film AL1 is formed of a material which exhibits horizontal alignment properties.

In the meantime, the array substrate AR may include a part of the common electrode CE.

The counter-substrate CT is formed by using a second insulative substrate 20 having light transmissivity. The counter-substrate CT includes, on the inside of the second insulative substrate 20, that is, on the side thereof facing the array substrate AR, a black matrix BM, a color filter CF, an overcoat layer OC, the common electrode CE including main common electrode CAL and main common electrode CAR, and a second alignment film AL2.

The black matrix BM partitions the pixels PX and forms an aperture portion AP which is opposed to the pixel electrode PE. Specifically, the black matrix BM is disposed so as to be opposed to wiring portions, such as the source lines, gate lines, storage capacitance lines, and switching elements. In this example, the black matrix BM includes portions extending in the second direction Y, and portions extending in the first direction X. The black matrix BM is disposed on an inner surface 20A of the second insulative substrate 20, which is opposed to the array substrate AR.

The color filter CF is disposed in association with each pixel PX. Specifically, the color filter CF is disposed in the aperture portion AP on the inner surface 20A of the second insulative substrate 20, and a part of the color filter CF extends over the black matrix BM. Color filters CF, which are disposed in the pixels PX neighboring in the first direction X, have mutually different colors. For example, the color filters CF are formed of resin materials which are colored in three primary colors of red, blue and green. A red color filter, which is formed of a resin material that is colored in red, is disposed in association with a red pixel. A blue color filter, which is formed of a resin material that is colored in blue, is disposed in association with a blue pixel. A green color filter, which is formed of a resin material that is colored in green, is disposed in association with a green pixel. Boundaries between these color filters CF are located at positions overlapping the black matrix BM.

The overcoat layer OC covers the color filters CF. The overcoat layer OC reduces the effect of asperities on the surfaces of the color filters CF. The overcoat layer OC is formed of, for example, a transparent resin material.

The main common electrode CAL and main common electrode CAR of the common electrode CE are formed on that side of the overcoat layer OC, which is opposed to the array substrate AR. The main common electrode CAL is located above the source line S1 and is located below the black matrix BM. The main common electrode CAR is located above the source line S2 and is located below the black matrix BM. The width of each of the main common electrode CAL and main common electrode CAR in the first direction X is substantially equal to the width of the black matrix BM which is located thereabove. In the aperture portion AP, the region between the main common electrode CAL and main common electrode CAR, on the one hand, and the main pixel electrode PA, on the other hand, corresponds to a transmissive region through which light can pass.

The second alignment film AL2 is disposed on that surface of the counter-substrate CT, which is opposed to the array substrate AR, and the second alignment film AL2 extends over substantially the entirety of the active area ACT. The second alignment film AL2 covers the main common electrodes CAL, main common electrode CAR and overcoat layer OC. The second alignment film AL2 is formed of a material which exhibits horizontal alignment properties.

The first alignment film AL1 and second alignment film AL2 are subjected to alignment treatment (e.g. rubbing treatment or optical alignment treatment) for initially aligning the liquid crystal molecules of the liquid crystal layer LQ. A first alignment treatment direction PD1, in which the first alignment film AL1 initially aligns the liquid crystal molecules, is parallel to a second alignment treatment direction PD2, in which the second alignment film AL2 initially aligns the liquid crystal molecules. In an example shown in part (A) of FIG. 2, the first alignment treatment direction PD1 and second alignment treatment direction PD2 are parallel to the second direction Y and are identical. In an example shown in part (B) of FIG. 2, the first alignment treatment direction PD1 and second alignment treatment direction PD2 are parallel to the second direction Y and are opposite to each other.

The above-described array substrate AR and counter-substrate CT are disposed such that their first alignment film AL1 and second alignment film AL2 are opposed to each other. In this case, columnar spacers, which are formed of, e.g. a resin material so as to be integral to one of the array substrate AR and counter-substrate CT, are disposed between the first alignment film AL1 of the array substrate AR and the second alignment film AL2 of the counter-substrate CT. Thereby, a predetermined cell gap, for example, a cell gap of 2 to 7 μm, is created. The array substrate AR and counter-substrate CT are attached by a sealant on the outside of the active area ACT in the state in which the predetermined cell gap is created therebetween.

The liquid crystal layer LQ is held in the cell gap which is created between the array substrate AR and the counter-substrate CT, and is disposed between the first alignment film AL1 and second alignment film AL2. The liquid crystal layer LQ includes liquid crystal molecules LM. The liquid crystal layer LQ is composed of a liquid crystal material having a positive (positive-type) dielectric constant anisotropy.

A first polarizer PL1 is attached, by, e.g. an adhesive, to an outer surface of the array substrate AR, that is, an outer surface 10B of the first insulative substrate 10 which constitutes the array substrate AR. The first polarizer PL1 is located on that side of the liquid crystal display panel LPN, which is opposed to the backlight 4, and controls the polarization state of incident light which enters the liquid crystal display panel LPN from the backlight 4. The first polarizer PL1 has a first polarization axis (or first absorption axis) AX1. In the meantime, another optical element, such as a retardation plate, may be disposed between the first polarizer PL1 and the first insulative substrate 10.

A second polarizer PL2 is attached, by, e.g. an adhesive, to an outer surface of the counter-substrate CT, that is, an outer surface 20B of the second insulative substrate 20 which constitutes the counter-substrate CT. The second polarizer PL2 is located on the display surface side of the liquid crystal display panel LPN, and controls the polarization state of emission light emerging from the liquid crystal display panel LPN. The second polarizer PL2 has a second polarization axis (or second absorption axis) AX2. In the meantime, another optical element, such as a retardation plate, may be disposed between the second polarizer PL2 and the second insulative substrate 20.

The first polarization axis AX1 of the first polarizer PL1 and the second polarization axis AX2 of the second polarizer PL2 have a positional relationship of crossed Nicols. In this case, one of the polarizers is disposed such that the polarization axis thereof is parallel or perpendicular to the direction of extension of the main pixel electrode PA or main common electrode CA. Specifically, when the direction of extension of the main pixel electrode PA or main common electrode CA is the second direction Y, the polarization axis of one polarizer is substantially parallel to the second direction Y or is substantially perpendicular to the second direction Y.

Alternatively, one of the polarizers is disposed such that the polarization axis thereof is parallel or perpendicular to the initial alignment direction of liquid crystal molecules, i.e., the first alignment treatment direction PD1 or second alignment treatment direction PD2. When the initial alignment direction is parallel to the second direction Y, the polarization axis of one polarizer is substantially parallel to the second direction Y or is substantially parallel to the first direction X.

In an example shown in part (a) of FIG. 2, the first polarizer PL1 is disposed such that the first polarization axis AX1 thereof is perpendicular to the direction (second direction Y) of extension of the main pixel electrode PA or the direction of extension of the main common electrode CA. Specifically, the first polarization axis AX1 is parallel to the first direction X. The second polarizer PL2 is disposed such that the second polarization axis AX2 thereof is parallel to the direction of extension of the main pixel electrode PA or the direction of extension of the main common electrode CA. Specifically, the second polarization axis AX2 is parallel to the second direction Y.

In addition, in an example shown in part (b) of FIG. 2, the second polarizer PL2 is disposed such that the second polarization axis AX2 thereof is perpendicular to the direction (second direction Y) of extension of the main pixel electrode PA or the direction of extension of the main common electrode CA. Specifically, the second polarization axis AX2 is parallel to the first direction X. The first polarizer PL1 is disposed such that the first polarization axis AX1 thereof is parallel to the direction of extension of the main pixel electrode PA or the direction of extension of the main common electrode CA. Specifically, the first polarization axis AX1 is parallel to the second direction Y.

Next, the operation of the liquid crystal display panel LPN having the above-described structure is described with reference to FIG. 2 and FIG. 3.

Specifically, in a state in which no voltage is applied to the liquid crystal layer LQ, that is, in a state (OFF time) in which no electric field is produced between the pixel electrode PE and common electrode CE, the liquid crystal molecule LM of the liquid crystal layer LQ is aligned such that the major axis thereof is positioned in the first alignment treatment direction PD1 of the first alignment film AL1 and the second alignment treatment direction PD2 of the second alignment film AL2. This OFF time corresponds to the initial alignment state, and the alignment direction of the liquid crystal molecule LM at the OFF time corresponds to the initial alignment direction.

Strictly speaking, the liquid crystal molecule LM is not always aligned in parallel to the X-Y plane, and, in many cases, the liquid crystal molecule LM is pre-tilted. Thus, the initial alignment direction of the liquid crystal molecule LM corresponds to a direction in which the major axis of the liquid crystal molecule LM at the OFF time is orthogonally projected onto the X-Y plane. In the description below, for the purpose of simplicity, it is assumed that the liquid crystal molecule LM is aligned in parallel to the X-Y plane, and the liquid crystal molecule LM rotates in a plane parallel to the X-Y plane.

In this case, each of the first alignment treatment direction PD1 and the second alignment treatment direction PD2 is substantially parallel to the second direction Y. At the OFF time, the liquid crystal molecule LM is initially aligned such that the major axis thereof is substantially parallel to the second direction Y, as indicated by a broken line in FIG. 2. Specifically, the initial alignment direction of the liquid crystal molecule LM is parallel to the second direction Y (or 0° to the second direction Y) which is the direction of extension of the main pixel electrode PA or the main common direction CA.

When the first alignment treatment direction PD1 and the second alignment treatment direction PD2 are parallel and identical to each other, as in the example illustrated, the liquid crystal molecules LM are substantially horizontally aligned (the pre-tilt angle is substantially zero) in the middle part of the liquid crystal layer LQ in the cross section of the liquid crystal layer LQ, and the liquid crystal molecules LM are aligned with such pre-tilt angles that the liquid crystal molecules LM become symmetric in the vicinity of the first alignment film AL1 and in the vicinity of the second alignment film AL2, with respect to the middle part as the boundary (splay alignment). In the state in which the liquid crystal molecules LM are splay-aligned, optical compensation can be made by the liquid crystal molecules LM in the vicinity of the first alignment film AL1 and the liquid crystal molecules LM in the vicinity of the second alignment film AL2, even in a direction inclined to the normal direction of the substrate. Therefore, when the first alignment treatment direction PD1 and the second alignment treatment direction PD2 are parallel and identical to each other, light leakage is small in the case of black display, a high contrast ratio can be realized, and the display quality can be improved.

In the meantime, when the first alignment treatment direction PD1 and the second alignment treatment direction PD2 are parallel and opposite to each other, the liquid crystal molecules LM are aligned with substantially equal pre-tilt angles, in the cross section of the liquid crystal layer LQ, in the vicinity of the first alignment film AL1, in the vicinity of the second alignment film AL2, and in the middle part of the liquid crystal layer LQ (homogeneous alignment).

Part of light from the backlight 4 passes through the first polarizer PL1 and enters the liquid crystal display panel LPN. The polarization state of the light, which enters the liquid crystal display panel LPN, is linear polarization perpendicular to the first polarization axis AX1 of the first polarizer PL1. The polarization state of such linear polarization hardly varies when the light passes through the liquid crystal display panel LPN at the OFF time. Thus, the linearly polarized light, which has passed through the liquid crystal display panel LPN, is absorbed by the second polarizer PL2 that is in the positional relationship of crossed Nicols in relation to the first polarizer PL1 (black display).

On the other hand, in a state in which a voltage is applied to the liquid crystal layer LQ, that is, in a state (ON time) in which a potential difference is produced between the pixel electrode PE and common electrode CE, a lateral electric field (or an oblique electric field), which is substantially parallel to the substrates, is produced between the pixel electrode PE and the common electrode CE. The liquid crystal molecules LM are affected by the electric field, and the major axes thereof rotate within a plane which is substantially parallel to the X-Y plane, as indicated by solid lines in the Figure.

In the example shown in FIG. 2, the liquid crystal molecule LM in a lower half part of the region between the pixel electrode PE and main common electrode CAL rotates clockwise relative to the second direction Y, and is aligned in a lower left direction in the Figure. The liquid crystal molecule LM in an upper half part of the region between the pixel electrode PE and main common electrode CAL rotates counterclockwise relative to the second direction Y, and is aligned in an upper left direction in the Figure. The liquid crystal molecule LM in a lower half part of the region between the pixel electrode PE and main common electrode CAR rotates counterclockwise relative to the second direction Y, and is aligned in a lower right direction in the Figure. The liquid crystal molecule LM in an upper half part of the region between the pixel electrode PE and main common electrode CAR rotates clockwise relative to the second direction Y, and is aligned in an upper right direction in the Figure.

As has been described above, in the state in which the electric field is produced between the pixel electrode PE and common electrode CE in each pixel PX, the liquid crystal molecules LM are aligned in a plurality of directions, with boundaries at positions overlapping the pixel electrode PE, and domains are formed in the respective alignment directions. Specifically, a plurality of domains are formed in one pixel PX.

At such ON time, part of backlight, which is incident on the liquid crystal display panel LPN from the backlight 4, passes through the first polarizer PL1, and enters the liquid crystal display panel LPN. The light entering the liquid crystal display panel LPN is linearly polarized light which is perpendicular to the first polarization axis AX1 of the first polarizer PL1. The polarization state of such linearly polarized light varies depending on the alignment state of the liquid crystal molecules LM when the light passes through the liquid crystal layer LQ. For example, when linearly polarized light, which is parallel to the first direction X, has entered the liquid crystal display panel LPN, the light is affected, while passing through the liquid crystal layer LQ, by a retardation of $\lambda/2$ by the liquid crystal molecules which are aligned in a 45°-225° azimuth direction or a 135°-315° azimuth direction relative to the first direction X ($\lambda$ is a wavelength of light passing through the liquid crystal layer LQ). Thereby, the polarization state of the light, which has passed through the liquid crystal layer LQ, becomes linear polarization parallel to the second direction Y. Thus, at the ON time, at least part of the light emerging from the liquid crystal layer LQ passes through the second polarizer PL2 (white display).

According to the present embodiment, a high transmittance can be obtained in the inter-electrode gap between the pixel electrode PE and the common electrode CE. Thus, a transmittance per pixel can sufficiently be increased by increasing the inter-electrode distance between the main pixel electrode and the main common electrode. As regards product specifications in which the pixel pitch is different, the peak condition of the transmittance distribution can be used by varying the inter-electrode distance between the main pixel electrode and the main common electrode. Specifically, in the display mode of the present embodiment, products with various pixel pitches can be provided by setting the inter-electrode distance, without necessarily requiring fine electrode processing, as regards the product specifications from low-resolution product specifications with a relatively large pixel pitch to high-resolution product specifications with a relatively small pixel pitch. Therefore, requirements for high transmittance and high resolution can easily be realized.

In addition, according to the present embodiment, in the region overlapping the black matrix BM, the transmittance is sufficiently lowered. The reason for this is that the electric field does not leak to the outside of the pixel from the position of the common electrode CE that is located above the source line S, and an undesired lateral electric field does not occur between pixels which neighbor each other with the black matrix BM interposed, and therefore the liquid crystal molecules LM in the region overlapping the black matrix BM keep the initial alignment state, like the case of the OFF time (or black display time). Accordingly, even when the colors of the color filters are different between neighboring pixels, the occurrence of color mixture can be suppressed, and the decrease in color reproducibility or the decrease in contrast ratio can be suppressed.

When misalignment occurs between the array substrate AR and the counter-substrate CT, there are cases in which a difference occurs in the horizontal inter-electrode distance between the pixel electrode PE and the common electrodes CE on both sides of the pixel electrode PE. However, since such misalignment commonly occurs in all pixels PX, the electric field distribution does not differ between the pixels PX, and the influence on the display of images is very small. In addition, even when misalignment occurs between the array substrate AR and the counter-substrate CT, leakage of an undesired electric field to the neighboring pixel can be suppressed. Thus, even when the colors of the color filters differ between neighboring pixels, the occurrence of color mixture can be suppressed, and the decrease in color reproducibility or the decrease in contrast ratio can be suppressed.

According to the present embodiment, the main common electrodes CA are opposed to the source lines S. In particular, when the main common electrode CAL and main common electrode CAR are disposed immediately above the source line S1 and source line S2, respectively, the aperture portion AP can be increased and the transmittance of the pixel PX can be improved, compared to the case in which the main common electrode CAL and main common electrode CAR are disposed on the pixel electrode PE side of the source line S1 and source line S2.

Furthermore, by disposing the main common electrode CAL and main common electrode CAR immediately above the source line S1 and source line S2, respectively, the inter-electrode distance between the pixel electrode PE, on the one hand, and the main common electrode CAL and main common electrode CAR, on the other hand, can be increased, and a lateral electric field, which is closer to a horizontal lateral electric field, can be produced. Therefore, a wide viewing angle, which is the advantage of an IPS mode, etc. in the conventional structure, can be maintained.

According to the present embodiment, a plurality of domains can be formed in one pixel. Thus, the viewing angle can optically be compensated in plural directions, and a wide viewing angle can be realized.

The above-described example is directed to the case where the initial alignment direction D of liquid crystal molecules LM is parallel to the second direction Y that is the direction of extension of, e.g. the main pixel electrode PA (i.e. an angle θ1 formed between the second direction Y and the initial alignment direction D is 0°). However, the initial alignment direction D of liquid crystal molecules LM may be substantially perpendicular to the direction of extension of, e.g. the main pixel electrode PA.

The above-described example relates to the case in which the liquid crystal layer LQ is composed of a liquid crystal material having a positive (positive-type) dielectric constant anisotropy. Alternatively, the liquid crystal layer LQ may be composed of a liquid crystal material having a negative (negative-type) dielectric constant anisotropy. Although a detailed description is omitted, in the case of the negative-type liquid crystal material, since the positive/negative state of dielectric constant anisotropy is reversed, it is desirable that the angle θ1 formed between the second direction Y and the initial alignment direction D be 90°. Specifically, in this case, the initial alignment direction D of liquid crystal molecules LM is substantially perpendicular to the second direction Y that is the direction of extension of, e.g. the main pixel electrode PA (i.e. the initial alignment direction D is substantially parallel to the first direction X).

Over the pixel electrode PE or over the common electrode CE, since a lateral electric field is hardly produced (or an electric field enough to drive liquid crystal molecules LM is not produced) even at the ON time, as well as the OFF time, the liquid crystal molecules LM scarcely move from the initial alignment direction, like the case of the OFF time. Thus, even if the pixel electrode PE and common electrode CE are formed of a light-transmissive, electrically conductive material such as ITO, little backlight passes through these regions, and these regions hardly contribute to display at the ON time. Thus, the pixel electrode PE and the common electrode CE do not necessarily need to be formed of a transparent, electrically conductive material, and may be formed of an opaque wiring material. In other words, compared to the case where the pixel electrode PE and common electrode CE are formed of the transparent, electrically conductive material, even if the pixel electrode PE and common electrode CE are formed of the opaque wiring material, it is possible to suppress a decrease in transmittance at the ON time, or to suppress a decrease in area of the aperture portion AP.

Next, a study is made of the effect in the case where at least one of the pixel electrode PE and the common electrode CE is formed of an electrically conductive material with light-blocking properties or reflectivity (opaque wiring material), for instance, one selected from aluminum (Al), titanium (Ti), silver (Ag), molybdenum (Mo), tungsten (W), copper (Cu) and chromium (Cr), or an alloy including one of these elements.

The pixel electrode PE and the common electrode CE include edges which are parallel to the first direction X or second direction Y. For example, the main pixel electrode PA of the pixel electrode PE extends in the second direction Y, and this main pixel electrode PA includes edges which are parallel to the second direction Y. Similarly, the main common electrode CA of the common electrode CE extends in the second direction Y, and this main common electrode CA includes edges which are parallel to the second direction Y. In addition, in the example shown in FIG. 2, the sub-pixel electrode PB of the pixel electrode PE extends in the first direction X, and this sub-pixel electrode PB includes edges which are parallel to the first direction X.

Figure 4:
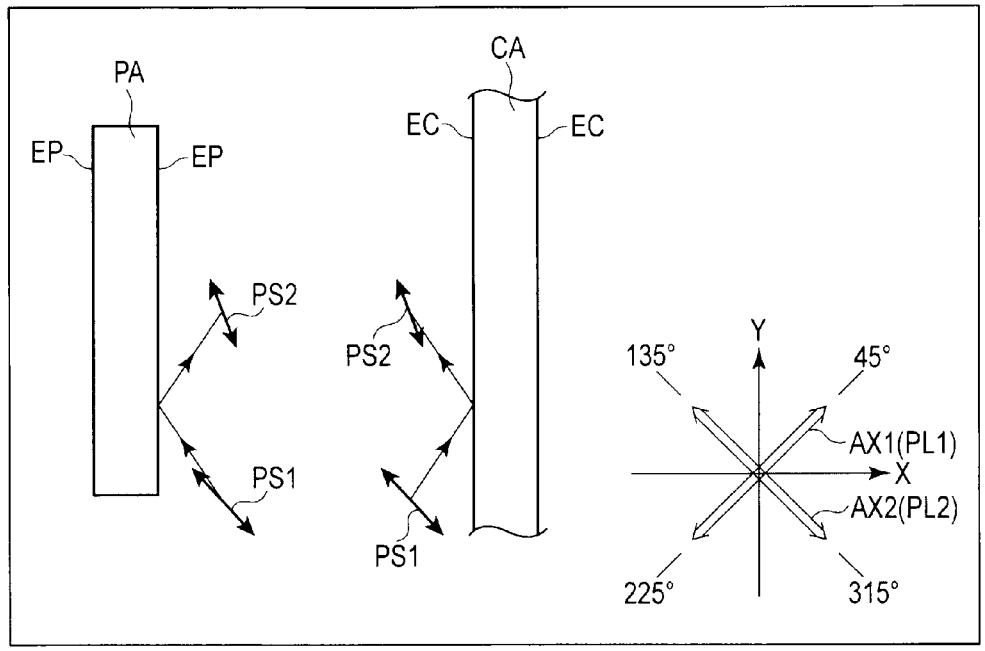
FIG. 4 is a view which schematically illustrates a relationship between planes of polarization of linearly polarized light and the shapes of a main pixel electrode and a main common electrode in a comparative example.

FIG. 4 is a view which schematically illustrates a relationship between planes of polarization of linearly polarized light and the shapes of a main pixel electrode PA and a main common electrode CA in a comparative example.

Edges EP of the main pixel electrode PA and edges EC of the main common electrode CA, shown in FIG. 4, are parallel to the second direction Y. In the case where the main pixel electrode PA and main common electrode CA are formed of the opaque wiring material as described above, Linearly polarized light, which has passed through the first polarizer, passes through a region between the main pixel electrode PA and main common electrode CA, and is reflected by the main pixel electrode PA and main common electrode CA.

When linearly polarized light having a plane of polarization in an azimuth direction crossing at acute angle the edge EP or edge EC that is parallel to the second direction Y in the X-Y plane (i.e. linearly polarized light having a plane of polarization which is not parallel to the first direction X or second direction Y) is reflected by the edge EP or edge EC, such a phenomenon may occur that this plane of polarization is disturbed and the plane of polarization at a time when the linearly polarized light has passed through the first polarizer cannot be maintained. This phenomenon may occur in the case where the pixel electrode PE and common electrode CE are formed of the above-described opaque wiring material. In the case where the pixel electrode PE and common electrode CE are formed of a transparent, electrically conductive material such as ITO, reflection hardly occurs at the pixel electrode PE or common electrode CE, and there is little need to consider the effect of reflection.

In the comparative example illustrated, the first polarization axis AX1 of the first polarizer PL1, which serves as a polarizer, is set at, e.g. 45°-225° azimuth to the first direction X, and the second polarization axis AX2 of the second polarizer PL2, which serves as an analyzer, is set at, e.g. 135°-315° azimuth to the first direction X. In this case, the plane of polarization PS1 of linearly polarized light, which has passed through the first polarizer PL1, is at about 135°-315° azimuth. In some cases, when such linearly polarized light with the plane of polarization PS1 is reflected by the edge EP or edge EC, this linearly polarized light may become linearly polarized light having a plane of polarization PS2 in a direction different from the 135°-315° azimuth. The linearly polarized light with the plane of polarization PS2 is not sufficiently absorbed by the second polarizer PL2 that is the analyzer, and light leakage occurs at the OFF time in the vicinity of the edge EP or edge EC. Specifically, the transmittance cannot sufficiently be reduced at the time of black display, leading to degradation in contrast ratio.

In the meantime, since the black matrix BM is disposed immediately above the main common electrode CA, if the width of the black matrix BM is made greater than the width of the main common electrode CA, light in the vicinity of the edge EC of the main common electrode CA can be blocked, and light leakage can be suppressed. However, owing to the increase in width of the black matrix BM, the area of the aperture portion AP decreases.

In addition, since the black matrix BM is not disposed immediately above the main pixel electrode PA, it is difficult to suppress light leakage in the vicinity of the edge EP of the main pixel electrode PA.

Figure 5:
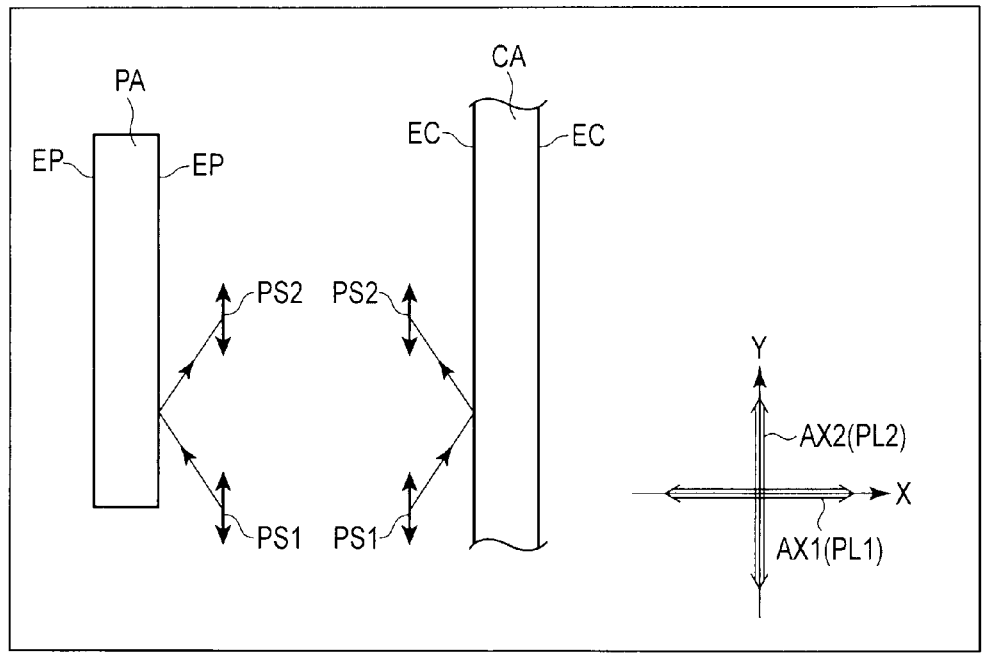
FIG. 5 is a view which schematically illustrates a relationship between planes of polarization of linearly polarized light and the shapes of the main pixel electrode and main common electrode in the embodiment.

FIG. 5 is a view which schematically illustrates a relationship between planes of polarization of linearly polarized light and the shapes of the main pixel electrode PA and main common electrode CA in the embodiment.

In the case where the first polarization axis AX1 of the first polarizer PL1, which serves as a polarizer, is set to be parallel to the first direction X (i.e. 0°-180° azimuth) and the second polarization axis AX2 of the second polarizer PL2, which serves as an analyzer, is set to be perpendicular to the first direction X (i.e. 90°-270° azimuth), the plane of polarization PS1 of linearly polarized light, which has passed through the first polarizer PL1, is at about 90°-270° azimuth. Specifically, the plane of polarization PS1 is parallel to the direction of extension of the edge EP or edge EC.

When this linearly polarized light with the plane of polarization PS1 is reflected by the edge EP or edge EC, this plane of polarization is hardly disturbed and the plane of polarization PS1 at a time when the linearly polarized light has passed through the first polarizer PL1 can be maintained. Specifically, the plane of polarization PS2 of the linearly polarized light reflected by the edge EP or edge EC is still at 90°-270° azimuth. Since such linearly polarized light with the plane of polarization PS2 is sufficiently absorbed by the second polarizer PL2 that is the analyzer, light leakage at the OFF time in the vicinity of the edge EP or edge EC can be suppressed. Thus, the transmittance can sufficiently be reduced at the time of black display, and degradation in contrast ratio can be suppressed.

In addition, since there is no need to increase the width of the black matrix BM that is located immediately above the main common electrode CA, and the area of the aperture portion AP can be increased, a high transmittance can be obtained. Furthermore, light leakage in the vicinity of the edge EP of the main pixel electrode PA can be suppressed, despite the black matrix BM not being disposed immediately above the main pixel electrode PA. Therefore, the degradation in display quality can be suppressed.

The above description has been give of the case in which the plane of polarization PS1 of the linearly polarized light is parallel to the direction of extension of the edge EP or edge EC. However, even in the case where the plane of polarization PS1 of the linearly polarized light, which has passed through the first polarizer PL1, is perpendicular to the direction of extension of the edge EP or edge EC, the disturbance of the plane of polarization of reflective light at the edge EP or edge EC can be suppressed, and the same advantageous effects can be obtained.

Various wiring lines, such as source lines, gate lines and storage capacitance lines, are formed of the above-described opaque wiring material, to be more specific, a metallic material such as aluminum (Al), titanium (Ti), silver (Ag), molybdenum (Mo), tungsten (W), copper (Cu) or chromium (Cr). At least some of these wiring lines include edges which are parallel to the first direction X or second direction Y. Thus, in the comparative example in which use is made of linearly polarized light having the plane of polarization which crosses at an acute angle the edges of such wiring lines, there is concern that the plane of polarization of reflective light at the edge of the wiring line is disturbed and light leakage occurs in the vicinity of the edge of the wiring line. By contrast, in the present embodiment in which use is made of linearly polarized light having the plane of polarization which is substantially parallel or substantially perpendicular to the edges of such wiring lines, it is possible to suppress light leakage in the vicinity of the edge of the wiring line, without increasing the width of the black matrix, and it is possible to realize a high transmittance and a high contrast ratio.

In the present embodiment, the structure of the pixel PX is not limited to the example shown in FIG. 2.

The above-described example relates to the structure in which the storage capacitance line is disposed immediately below the sub-pixel electrode PB. However, the gate line may be disposed immediately below the sub-pixel electrode PB. In addition, the position of disposition of the storage capacitance line may not be a substantially central part of the pixel, and the position of disposition of the gate line may not be the upper side end portion or lower side end portion of the pixel.

The above-described example relates to the case in which the pixel electrode PE includes the main pixel electrode PA and sub-pixel electrode PB. However, the pixel electrode PE may not include the sub-pixel electrode PB, if the pixel electrode PE can be electrically connected to the switching element SW.

The above-described example relates to the case in which the direction of extension of the main pixel electrode PA is the second direction Y. However, the main pixel electrode PA may extend in the first direction X. In this case, the direction of extension of the main common electrode CA is the first direction X. In addition, in this case, when the first wiring lines along the first direction X are the gate lines G, as in the above-described example, the main common electrodes CA are opposed to the gate lines G. However, when the first wiring lines along the first direction X are the source lines S and the second wiring lines along the second direction Y are the gate lines G, the main common electrodes CA are opposed to the source lines S.

The above-described example relates to the case in which in relation to the pixel electrode PE including the main pixel electrode PA corresponding to a first electrode, there is provided the common electrode CE including the main common electrodes CA as second electrodes located on both sides of the first electrode. Alternatively, in relation to the common electrode CE including the main common electrode CA corresponding to a first electrode, there may be provided the pixel electrode PE including the main pixel electrodes PA as second electrodes located on both sides of the first electrode.

The above-described example relates to the case in which the common electrode CE includes the main common electrodes CA on the counter-substrate, but the embodiment is not limited to this example. For example, the common electrode CE may include, in addition to the above-described main common electrodes CA, sub-common electrodes which are provided on the counter-substrate CT and are opposed to the gate lines G and storage capacitance line C. The sub-common electrodes extend in the first direction X and are formed integral or continuous with the main common electrodes CA.

The array substrate AR may include first shield electrodes which are located above the source lines S via an insulation film. The first shield electrodes extend in the second direction Y, are electrically connected to the main common electrodes CA within or outside the active area, and have the same potential as the common electrode CE. By the provision of the first shield electrodes, an undesired electric field from the source lines S can be shielded.

In addition, the array substrate AR may include second shield electrodes which are located above the gate lines G and storage capacitance line C via an insulation film. The second shield electrodes extend in the first direction X, and are electrically connected to the main common electrodes CA within or outside the active area. By the provision of the second shield electrodes, an undesired electric field from the gate lines G and storage capacitance line C can be shielded.

As has been described above, according to the present embodiment, there can be provided a liquid crystal display device which can suppress degradation in display quality.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A liquid crystal display device comprising:
a first substrate including a first insulative substrate, a first signal wiring line and a second signal wiring line each extending in a first direction on an inside of the first insulative substrate, a third signal wiring line extending in the first direction on the inside of the first insulative substrate and located at a substantially middle point between the first signal wiring line and the second signal wiring line, a first insulation film covering the first signal wiring line, the second signal wiring line and the third signal wiring line, a fourth signal wiring line and a fifth signal wiring line each extending on the first insulation film in a second direction which is substantially perpendicular to the first direction, a second insulation film covering the fourth signal wiring line and the fifth signal wiring line, a switching element electrically connected to the first signal wiring line and the fourth signal wiring line, a first electrode extending in the second direction on the second insulation film, a sub-electrode extending from the first electrode toward the fourth signal wiring line and the fifth signal wiring line and electrically connected to the switching element, and a first alignment film covering the first electrode and the sub-electrode;
a second substrate including a second insulative substrate, a second electrode extending in the second direction and opposed to the fourth signal wiring line and the fifth signal wiring line on that side of the second insulative substrate, which is opposed to the first substrate, and a second alignment film covering the second electrode;
a liquid crystal layer including liquid crystal molecules held between the first substrate and the second substrate;
a first polarizer which is disposed on an outer surface of the first insulative substrate and includes a first polarization axis which is substantially parallel to the first direction or the second direction; and
a second polarizer which is disposed on an outer surface of the second insulative substrate and includes a second polarization axis having a positional relationship of crossed Nicols with the first polarization axis.

2. The liquid crystal display device of claim 1, wherein at least one of the first electrode and the second electrode is formed of a metallic material selected from the group consisting of aluminum (Al), titanium (Ti), silver (Ag), molybdenum (Mo), tungsten (W), copper (Cu) and chromium (Cr), or an alloy including one selected from said group.

3. The liquid crystal display device of claim 2, wherein in a state in which an electric field is not produced between the first electrode and the second electrode, an initial alignment direction of the liquid crystal molecules is substantially parallel to or substantially perpendicular to a direction of extension of the first electrode, and the liquid crystal molecules are splay-aligned or homogeneously aligned between the first substrate and the second substrate.

* * * * *